Jan. 15, 1963 F. J. G. VAN DEN BOSCH 3,073,521

METHOD FOR ELECTRONIC COUNTING AND DEVICE FOR THE WORKING THEREOF

Filed April 4, 1958 4 Sheets-Sheet 1

INVENTOR
Francois J. G. Van Den Bosch
by Wenderoth, Lind & Ponack
Attorneys

INVENTOR
Francois J.G. Van Den Bosch
by Wenderoth, Lind & Ponack
Attorneys

INVENTOR
Francois J.G. Van Den Bosch
by Wenderoth, Lind & Ponack
Attorneys

INVENTOR
Francois J.G. Van Den Bosch
by Wenderoth, Lind & Ponack
Attorneys

United States Patent Office 3,073,521

Patented Jan. 15, 1963

3,073,521

METHOD FOR ELECTRONIC COUNTING AND DEVICE FOR THE WORKING THEREOF

François Joseph Gérard van den Bosch, 138 Stenenbrug, Borgerhout, Antwerp, Belgium Filed Apr. 4, 1958, Ser. No. 726,431
Claims priority, application Belgium Apr. 4, 1957
6 Claims. (Cl. 235—92)

This invention relates to electronic counters which are used for counting separate objects by discriminating, by simple telling, by computing or by estimating in a given volume or surface.

For such a counting, the image obtained in an optical-electronical magnifying arrangement is lighted by means of an adequate light source and the magnified image is thrown, by means of an objective or a lens arrangement, on the photo-electric cathode of a television camera provided, for example, with a super-iconoscope. This image is then thrown on a photoconducting mosaic where it is analyzed by an electron beam. This scanning generates a sequential electric signal which contains all the information which makes up a complete image. So as to allow the proper reproducing of this image in a receiver, electric pulses are inserted to insure synchronizing of the analyzing and reproducing scanning. These pulses thus insure the synchronizing of the scanning line by line and also the change from one image to the following one. Synchronizing pulses must thus be inserted both for the lines and the frames. These signals are produced by a generator the frequency stabilization of which is frequently insured by coupling the frame change frequency with the frequency of the electric supply network. This frequency is, in most European countries, of 50 cycles. In the case of scanning with 819 lines and 25 interlaced frames (that is 50 half-frames) per second, the generator is for example made up of an oscillator with a working frequency of 40,950 cycles. This frequency is divided by two to obtain the line frequency and successively by three, three, seven and thirteen to obtain the frequency of 50 cycles which is the frequency of the half images which form the interlaced frames. This latter frequency is then compared with the frequency of the electric supply network and the differential signal thus obtained is applied to the main oscillator the working frequency of which is thus stabilized, which also stabilizes of course the frame and line frequencies.

It is also possible to scan or analyze the image by means of an analyzing light source. This light source can for example be a cathode-ray tube of the "Flying spot" type or a combination of Kerr cells which are preceded and followed by double Nichols' prisms, with a mirror drum. Use can also be made, for this purpose, of a combination of supersonic cells or of the various analyzing elements hereinbefore mentioned. This exploring light source thus scans the image and each light point being scanned is then focussed by lens arrangements on the photoconducting cathode of a photo-electric cell or of an electron multiplier. Even though this scanning or analyzing method is very much different from the one mentioned above, it does give similar electric signals and it is also necessary in this case to insert synchronizing signals.

When the image is made up of different objects which must be counted, such an operation is relatively simple if these objects have approximately the same size range and if their size can be made equal to the width of a single scan line. In such a case, it is only necessary to count the pulses of the video signal by eliminating, through electronic means, for example by amplitude discrimination, the pulses caused by the line and frame synchronizing signals. The number of pulses will then be the one of the objects present in the image being scanned and it is then necessary to integrate or to transmit these signals, through a delay line or network, to a recorder or computer which gives a visual indication of the counting. Such an indication can also be given by means of neon lamps which are controlled by separate electron tubes. The result can also be read on a measuring instrument such as a scaled micro- or milliammeter which is placed in the circuit of an electron tube, such as either the frequency discriminating tube or an amplifying tube or transistor the operating conditions of which have been adjusted in such a way that the current flow is proportional to the frequency.

The foregoing must only be thought of as a theoretical basis enabling better understanding of the invention principle, as the cases are few, in actual use, where the objects or particles to be counted have the same size and can be magnified in such a way that their size is equal to the width of a single scan line.

This invention has therefore for its object to provide a method for counting which enables not to take into account, within some limits, the different sizes or natures of the objects to be counted. For this purpose, in the method according to the invention, the image of the objects to be counted, formed by means of a light source, of a calibrated-volume cell and of lens arrangements, is thrown on the photo-electric cathode of a television camera and the electric signal thereof is transmitted to an image receiver in which an auxiliary pulse generator, which is synchronized by the scanning frequency, divides said frequency by a predetermined number, the resulting quotient signal being then applied to one of the control electrodes of the cathode-ray tube of said image receiver, which causes the formation thereon of a series of black lines, the magnifying of the objects to be counted being adjusted so that they fill the space between two succeeding black lines, part of the video signal of said receiver being applied to an auxiliary video amplifier whose first electron tube has such a negative control grid bias that the anode current is cut off and said tube is connected in parallel with a gas-filled tube such as a thyratron, said gas-filled tube being cut-off and a positive triggering pulse being applied to the control grid of said normally cut-off electron tube to initiate the counting, said triggering pulse being supplied from said auxiliary generator and lasting for a length of time corresponding to a complete horizontal and vertical scanning, that is to a complete frame (a half-frame for interlaced scanning), the pulses resulting from said division of the line scan frequency being added to said triggering pulse and the output of said auxiliary video amplifier being applied to an electronic counting device, so that all the objects lying on every black line of said image receiver are counted, the fall of the triggering pulse letting said normally cut-off electron tube return to its cut-off condition and initiating the thyratron working so that the circuit of said auxiliary video amplifier is cut short and the counting is thus stopped after scanning of a single frame (or half-frame for interlaced scanning).

In another embodiment of the method according to the invention, the focussing of the scanning electron beam of said television camera or of the beam of said scanning light source is so adjusted that the scanning spot occupies a space which is equal to a predetermined number of lines of the normal scanning of the cathode ray tube of said image receiver, the time basis of the scanning element operating then with a frequency which is a submultiple of the frequency of the time basis of said cathode ray tube of the image receiver.

This invention has also for its object an auxiliary video signal amplifier the first electron tube of which has such a negative control grid bias that the anode current is cut-off, said electron tube being triggered by pulses the duration of which is predetermined, said auxiliary video amplifier thus operating in response to said pulses.

Other details and features of the invention will appear from the description given below, by way of non limitative example and with reference to the accompanying drawings, in which.

So as to make the counting method according to this invention easier to understand, the working of this method will now be described as applied to the counting of red blood cells in a Thoma's cell. For this purpose, the cell is lighted by means of an adequate light source and, through an optical device known per se, the image of said cell is thrown on the photo-electric cathode of a television camera. A pulse is formed, by means of said auxiliary synchronizing signal generator, by dividing the line scan frequency by three and then again by three, the pulse being thus obtained once for every nine lines of the original line scan frequency. If such a pulse is applied to the time basis which controls the television camera, there will appear, on the screen of the cathode ray tube of the image receiver, a black line recurring once every nine lines of the scanning of said tube. However, by thus obtaining the auxiliary synchronizing signals from a frequency divider, the stabilization of the main synchronizing signal generator would be perturbed. It is then better to use the solution, perhaps more intricate but safer, of starting from the line synchronizing signals, by dividing them a first time by three and a second time by three and applying the resulting pulse to the time basis which controls the television camera, which also causes a black line on the screen of the image receiver once for every nine lines of the normal scanning. The counting will thus only be made once for every nine lines, that is the video signal output of the television camera will only comprise the signals registered for every ninth line in a communication system where the normal scanning is made with 819 lines, and the other lines, which are of no importance, have been cancelled. This means that it all occurs as if the scanning of the television camera only comprised a single line for every set of nine lines on the cathode ray tube of the image receiver.

Figure 2:
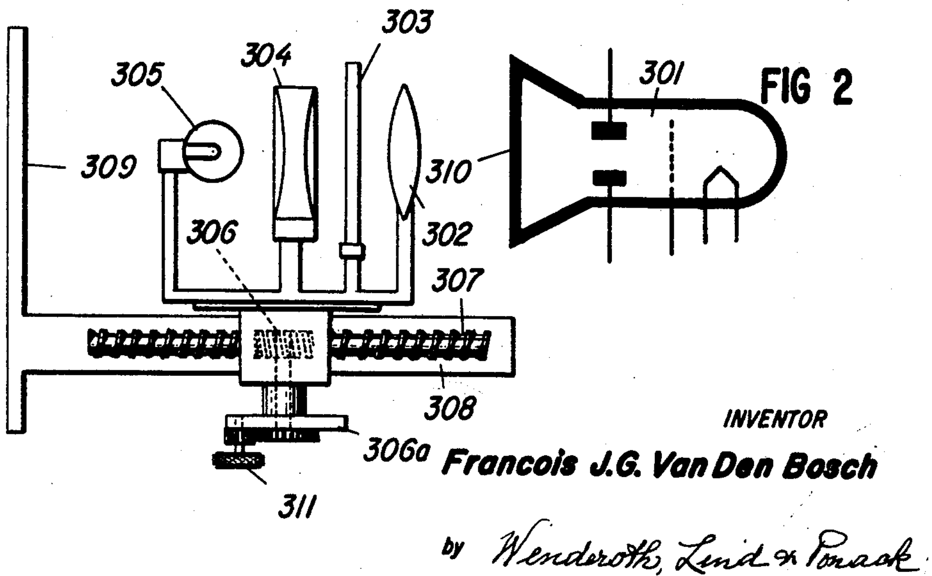
FIGURE 2 is a side view of a device for adjusting the optical magnifying.

This device also makes it possible to perform a complete and perfect counting by adjusting the magnifying rate to have such a size of the image of the objects to be counted that it occupies all of the space between two succeeding black lines on the screen of the cathode ray tube of the image receiver. Such an adjustment is easily made by means of the device shown in FIGURE 2. It is clear from this figure that the light source 305, the cell 303 and the optical sets 304 and 302 are arranged on a carriage which is axially moveable with respect to the electronic picture tube 301 of the television camera, such movement being made by means of a rack 307 which is supported by the slide bar 308 of the carriage and with which cooperates a pinion 306 which is rotated by means of a knurled knob 311.

In addition to the pulses which determine each ninth scan line of the camera, the inlet of the time basis controlling said camera also receives a pulse the duration and the action point of which are chosen in such a way that it corresponds to a half frame, that is with a complete frame frequency of 25 cycles/sec., to $\frac{1}{50}$ of a second in an interlaced frame scan. Thus, after scanning a half frame, the said pulse will cut off the second half frame and the object of said first half frame only will be counted. This pulse is also used to cut off a gas-filled lamp such as a thyratron and the circuit is designed so that the fall of said pulse will initiate the ionization, which will result in the short circuit of the video signal amplifier and thus stopping the counting operation.

The foregoing implies the use of a television camera and of an image receiver cathode ray tube under normal operating conditions, where the electron beam is focussed in such a way that it forms as small a spot as possible. This invention thus contemplates a counting method which is based on a scanning frequency which is consistent with the band width resulting from the counting. The same purpose can also be obtained by adjusting the focussing of the scanning electron beam of the television camera so that a single line scanned by said beam occupies a space equal to nine lines of the normal scanning of the cathode ray tube of the image receiver. This is of course only another embodiment of the invention.

The preferred embodiment of this invention is the easiest to put into actual use. From the auxiliary synchronizing signal generator already described is obtained a pulse for every nine lines of the normal scanning and this pulse is applied to one of the control electrodes of the cathode ray tube, that is the grid or the cathode. A black line is thus formed on the screen of the image receiver for every nine lines of the scanning caused by the time basis of said cathode ray tube, which time basis is in this case adjusted for an 819 line scan. The magnifying of the objects to be counted is then so adjusted that they occupy the space between two succeeding black lines. This adjustment is made by means of the device described above and shown in FIGURE 2.

Figure 3:
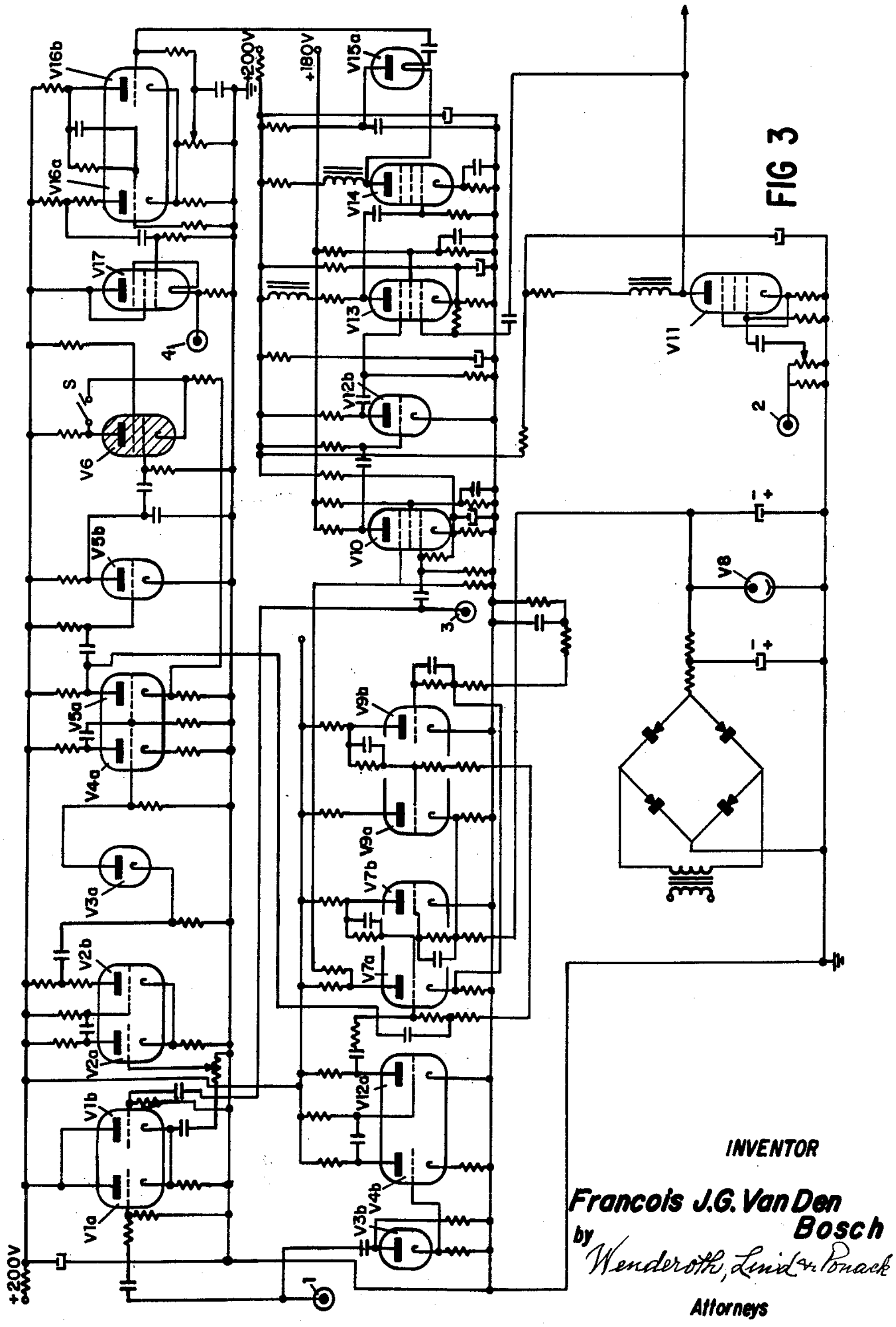
FIGURE 3 is a wiring diagram of an auxiliary video amplifier according to the invention.

The television camera tube operates as usual and is associated with conventional control and deflection circuits. The resulting video signal is fed both to a conventional video amplifier and to an auxiliary video amplifier shown in FIGURE 3. The output of the conventional video amplifier drives the cathode of the receiver cathode ray tube. Thus, an image of the preparation observed is always present on this cathoscope.

The auxiliary video amplifier receives the video signal, which is applied in 2, from the anode of tube V11 which is one of the conventional video amplifier tubes. It also receives in 1 the frame synchronizing pulses from the conventional deflection circuits and in 3 the line synchronizing pulses divided by nine which also originate from the conventional deflection circuits and are divided by nine by means of a dividing circuit which is well known in the television art.

These frame and line pulses are mixed (tubes **V1*a* and V1*b*) and used to drive a multivibrator (V2*a*—V2*b*) the output of which is clipped (diode V3*a*) and amplified (V4*a*). The output from the anode of V4*a* is applied to tube V5*a* which is connected in parallel with a thyratron tube V6 which normally substantially short cuts tube V5*a* so that no output can be obtained at the anode thereof. The output of tube V5*a* is fed to still another amplifying tube V5*b* the output of which is applied to the grid of thyratron V6**.

The frame pulses are also applied, after clipping (diode **V3*b*) and shaping (V4*b*—V12*a*), together with the output of tube V5*a*, to mixing and pulse-shaping tubes V7*a*, V7*b*, V9*a* and V9*b*. The mixed and shaped output pulse is then fed, together with the pulses corresponding to every ninth line (from 3) to a mixing and amplifying tube V10. The output therefrom is shaped (in tube V12*b*) and fed to one control grid of tube V13 which also receives on another control grid the video signal from tube V11. The output from tube V13 is then amplified (V14), shape (V15*a*, V16*a*, V16*b*) and fed to a cathode-follower (V17**) which supplies the counter proper.

When the counting operation begins, the thyratron V6 is extinguished, for example by means of a starting switch S, no current flows therethrough and tube **V5*a* can give an output signal. When the half frame pulse ends, the thyratron ionizes again and short cuts again tube V5*a***, so that the output signal therefrom is canceled and the counting is stopped for lack of the required pulses.

If another counting is to be made, it is only necessary to close again the starting switch and the above-described cycle will be exactly repeated. It is possible to use as means for showing the total count either a bank of electron tubes such as the E1T type or also Decatron-type tubes, neon tubes might also be used for this purpose by controlling them by means of electron tubes in flip-flop circuits. When mention is made of a half frame of 1/50 of a second, it must be understood that this is only true when use is made of the scanning and reproducing method which is usual in the television technics, in which 50 interlaced half frames are produced per second and only one of these half frames is used for the counting according to the invention. It is clear that if use is made of an equipment working with another analyzing and reproducing standard, in which for example there would be 25 complete frames per second, the counting would be made during one of these complete frames.

As regards the auxiliary video amplifier, the main difference with a normal video amplifier is that tube V5*a* is normally biased at the cut-off potential, the pulse being applied thereto triggering it back to normal operating conditions and letting the video signal pass through, said electron tube being again brought to cut-off conditions when the pulse falls. At this moment, the anode current flow through said electron tube will stop and the resulting rise of anode potential causes the parallel-connected thyratron to be ionized, which thus prevents said signal passing through after this single and only counting operation.

This invention has several advantages with very interesting practical embodiment. First of all, by adjusting the magnifying between two black lines spaced nine lines of the normal scanning apart, the errors or mistakes are prevented to the utmost. Secondly, for example, if red blood cells are to be counted, it is possible to only count first the blood cells with an approximate diameter of 7 microns and then, on the same image, the counting may be made of the blood cells with a diameter of 5 microns while passing over the blood cells with a diameter of 7 microns and the blood cells with a diameter smaller than 5 microns. It is thus possible to make a selective counting according to size. Thirdly, the method according to the invention makes it easier to discriminate by size or density. It will again be assumed that red blood cells are to be counted and that among these blood cells are present some lymphocytes, which have a size similar to the one of the red blood cells but which are optically less dense than said red blood cells. The counting signals will thus have a higher amplitude as compared with the amplitude corresponding to the lymphocytes. These latter ones will nonetheless be counted. Under such conditions, the video signal is applied to an amplitude discriminating tube, all the video signals being thus amplitude-limited and the objects with a higher optical density only will be counted. It is also possible to operate in the following way: a general counting is first made of all the elements and then a second counting in which are only counted the red blood cells with a higher optical density by amplitude-limiting the video signals, the differential of both countings thus indicating the number of lymphocytes. If the differential must be made between various white blood cells such as lymphocytes, polynuclears, mielocytes, etc., a plurality of succeeding countings are made while taking care that, for each counting, the discrimination is adjusted in the auxiliary video amplifier so as to have a very precise amplitude separation.

Figure 1:
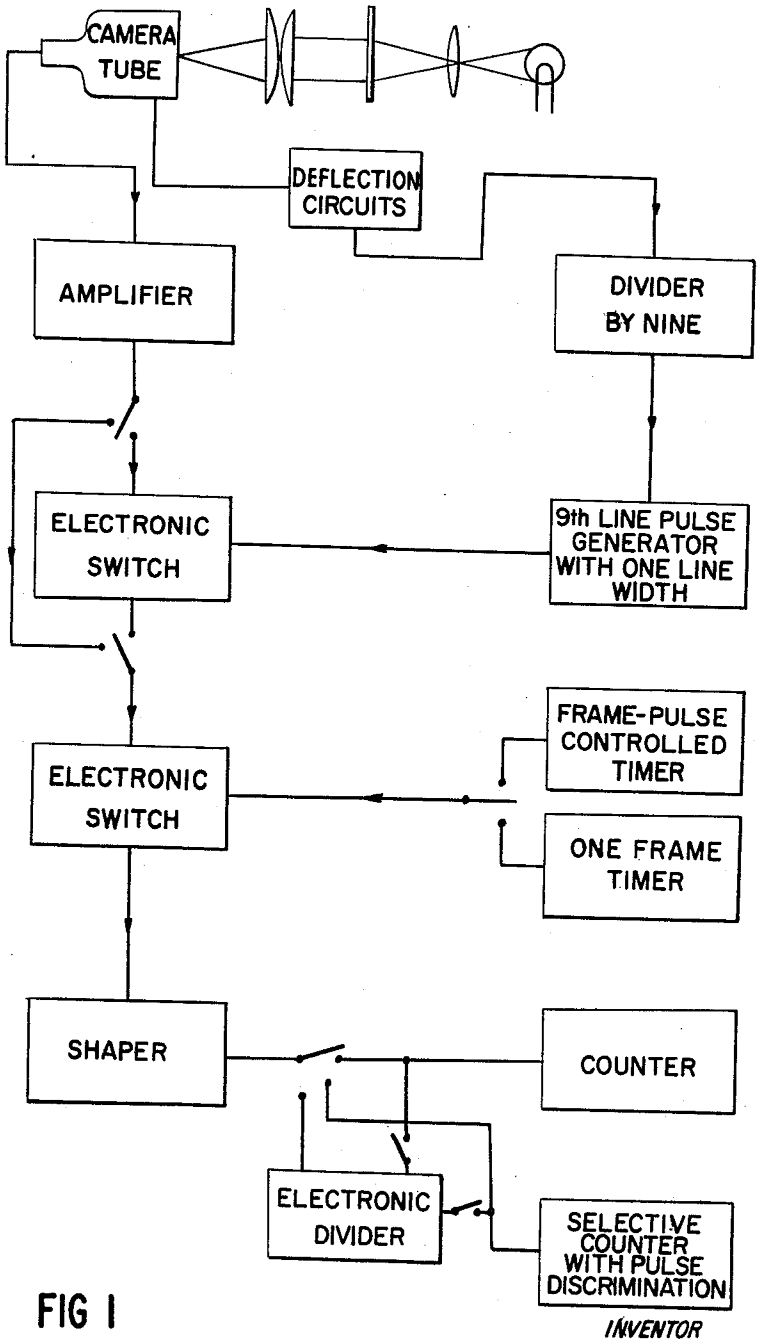
FIGURE 1 is a block diagram of an arrangement according to the invention.
Figure 5:
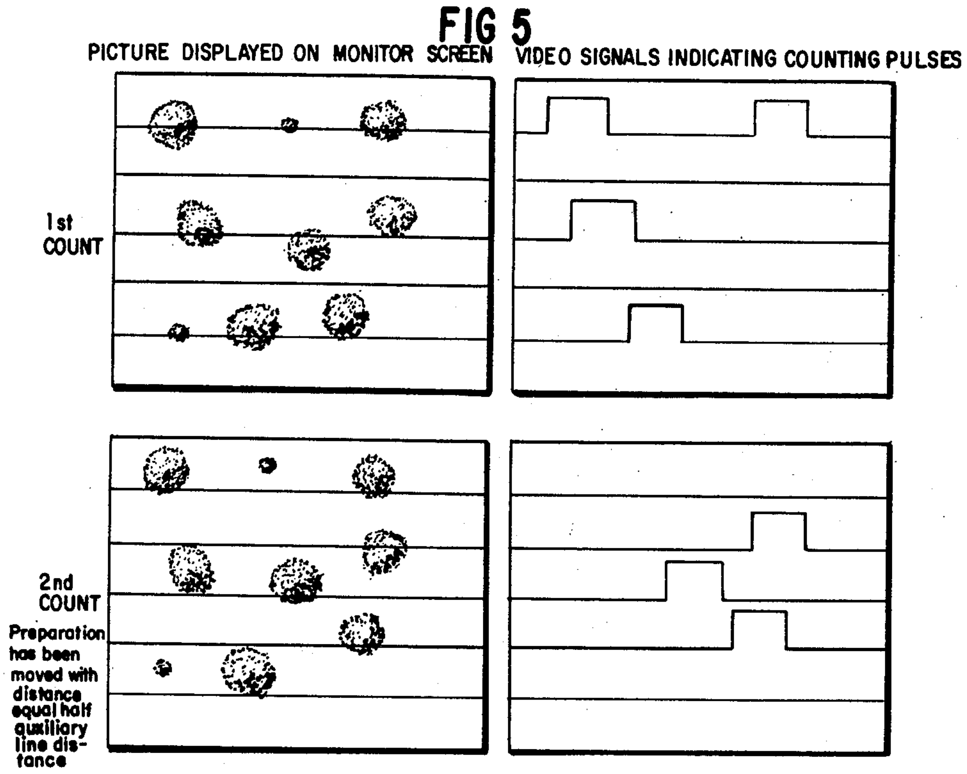
FIGURE 5 is a diagrammatic view showing a specific example of counting.
Figure 4:
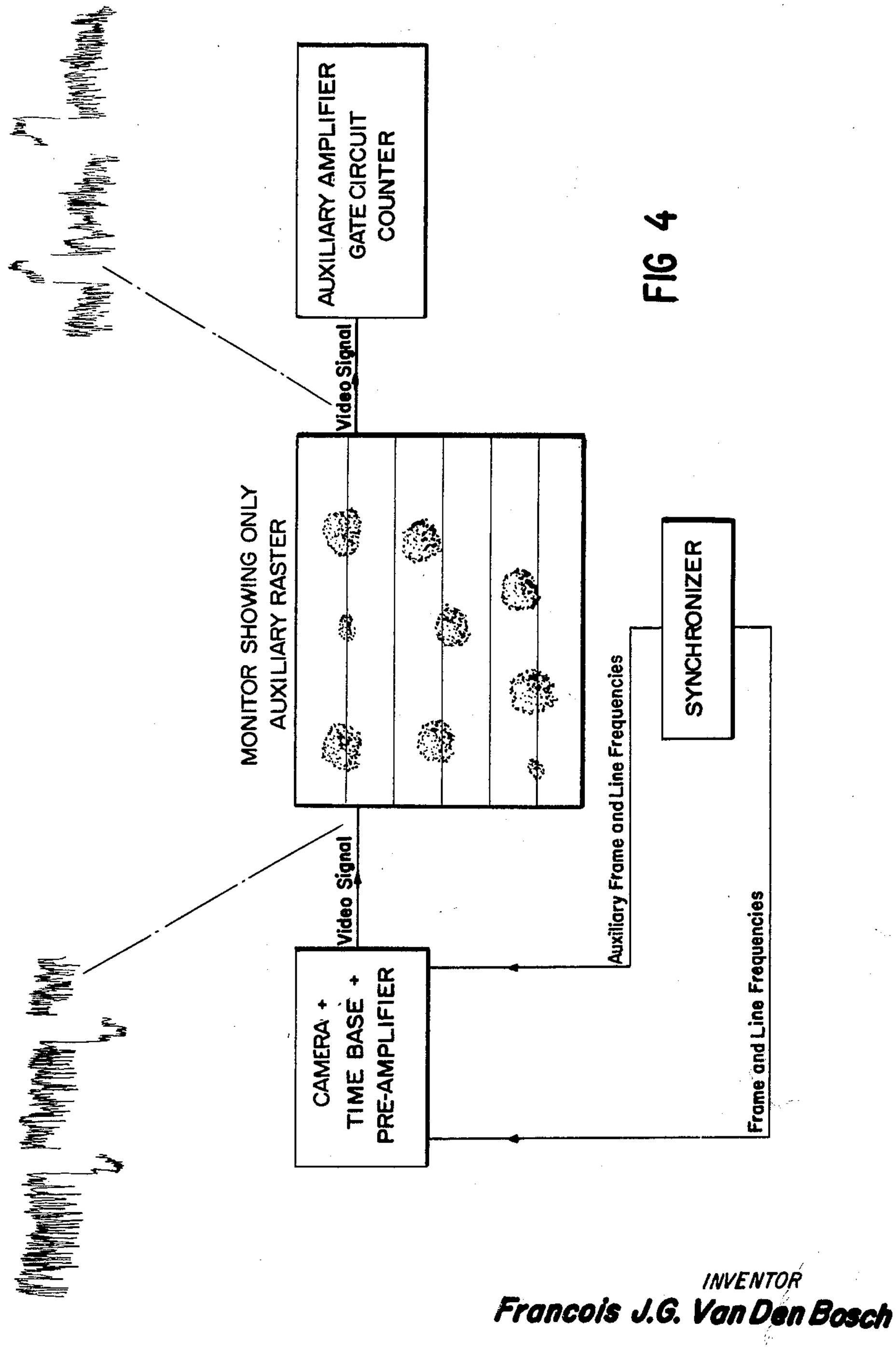
FIGURE 4 is a diagrammatic view showing the general layout.

FIGURE 4 is a general layout and FIGURE 5 is a specific example of counting. Referring to FIGURE 4, the synchroniser produces the normal frame and line frequencies (for say 525 lines) and these are fed to the time base of the camera, but it also produces by dividing the main line frequency, the auxiliary raster and these reduced line pulses are again mixed with the frame frequency so that on the screen there appear a series of black lines resulting from the application of the second frequency signal to the camera. (To make them appear black these signals are simply reversed.) The resulting signal is then fed to the video amplifier of the monitor and on the screen appears therefore a picture of the particles to be counted and the auxiliary frame. The video signal is shown and this video signal is then fed reversed to the auxiliary amplifier with its gate circuit and the counter. The counter will count only the pulses received.

FIGURE 5 shows an example of blood cell count. The waveforms produced by the intersection of the auxiliary raster on the blood cells are somewhat idealized. It is to show that only one electrical impulse is being produced by one particle and that the particle has to have a diameter equal to the distance between the two lines as the amplifier and gate circuit have a time constant incorporated which will only take notice of pulses of that particular length. This has the great advantage of counting particles of a definite size only and therefore proceed to some sort of "sizing" of particles in a particular preparation. The second count shows the preparation has been moved slightly so that the point of intersection with the blood cells falls on a point which is equal to half the distance between two counting lines. This is shown as an illustration but it is quite feasable to move the preparation as many times as one wants in order to achieve total count of particles of a specified size. The changing of objective at the microscope end will also allow the changing of the magnifying power and thus vary the size of the particles which are to be counted in succession so that all particles in a given preparation can be counted in succession and this for different diameters. The final count reflects thus also a "sizing" of the particles contained in the preparation, a great advantage over any system of counting developed hitherto.

In the alternative where the analyzing spot scans the preparation and where the spot has the diameter equal to the distance between two succeeding lines the problem remains identical as "sizing" is still performed owing to the time constant of the amplifier and gate.

It must be understood that the invention is in no way limited to the above embodiments and that many changes may be brought therein without departing from the scope of this invention, as defined by the appended claims.

I claim:

1. In an apparatus for electronic counting, a light source, a calibrated-volume cell, a lens arrangement, a television camera on which is thrown the image from said lens arrangement, a television receiver, a pulse generator in said receiver cooperating with said camera dividing the scanning frequency by a predetermined number, a cathode ray tube in said receiver, said resulting quotient frequency signal being fed to the control electrode of said cathode-ray tube, causing the formation thereon of a series of equidistant black lines, said lens arrangement being so adjusted that by magnifying the image of the objects to be counted substantially fills the space between two succeeding black lines, an auxiliary video amplifier in said receiver having one electron tube cut-off by a high negative grid bias, a gas-filled tube connected across said electron tube, said gas-filled tube being extinguished and a triggering pulse being applied to said cut-off tube to initiate the counting, said pulse being derived from said pulse generator and lasting for a time interval corresponding to a complete horizontal and vertical scanning, a mixing circuit in which are added the pulses resulting from the line scan frequency division and said triggering pulses, and an electronic counting device to which is applied the output of said auxiliary video amplifier, so that the pulses corresponding to the intersection of every object by the black lines are counted, the fall of the triggering pulse causing said normally cut-off electron tube to return to its cut-off condition and the thyratron to ionize again, so that the counting is stopped.

2. Apparatus as claimed in claim 1, in which the triggering pulses and the pulses resulting from the line scan frequency division are applied to the deflection circuits of the television camera tube as well as to said auxiliary video amplifier.

3. Apparatus as claimed in claim 1, which further comprises a scanning-type light source, such as a "flying-spot" tube.

4. Apparatus as claimed in claim 3, which further comprises light control means for said scanning-type light source, said control means being supplied with the triggering pulses and the pulses resulting from the line scan frequency division.

5. Apparatus as claimed in claim 1, which further comprises focussing means for the electron beam of the television camera tube, said means being so adjusted that the scanning spot covers a space which is equal to a predetermined number of lines of the normal scanning, the deflection circuits of the scanning tube then operating with a frequency which is a submultiple of the frequency of the receiver cathode-ray tube deflection circuits.

6. Apparatus as claimed in claim 1, which further comprises an adjustable support for the arrangement comprised of the light source, the lenses and the calibrated volume cell, so as to adjust the magnifying rate by changing the spacing between said arrangement and said television camera tube.

References Cited in the file of this patent

UNITED STATES PATENTS

| | | |
|---|---|---|
| 2,789,765 | Gillings | Apr. 23, 1957 |
| 2,791,377 | Dell et al. | May 7, 1957 |
| 2,791,697 | Dell | May 7, 1957 |
| 2,803,406 | Nuttall | Aug. 20, 1957 |
| 2,907,519 | Covely | Oct. 6, 1959 |
| 2,918,216 | Shapiro | Dec. 22, 1959 |